United States Patent Office 3,194,685
Patented July 13, 1965

3,194,685
METHOD OF MANUFACTURING STORAGE BATTERY ELECTRODE ACTIVE MATERIAL
James P. Malloy, Cheltenham, Pa., assignor to The Electric Storage Battery Company, a corporation of New Jersey
No Drawing. Filed Mar. 9, 1964, Ser. No. 350,532
6 Claims. (Cl. 136—27)

This patent application is a continuation-in-part of application Serial No. 78,876 filed December 28, 1960, and which will issue as U.S. Patent No. 3,124,486.

This invention relates to a method of manufacturing storage battery electrode active material. In particular, the invention relates to a method for manufacturing stable, pre-sulfated, dry active material for both positive and negative lead-acid storage battery electrodes.

The conventional method for preparing active material paste for lead-acid storage battery electrodes comprises mixing lead-lead oxide powder, water and sulfuric acid in a liquid-solids blender to provide a wet active material paste which is subsequently pasted onto storage battery grids. During the mixing operation, the amount of water and sulfuric acid added to the lead-lead oxide powder are varied so as to control the density and plasticity of the active material paste. The resulting paste is rather wet and is generally ready to be pasted onto grids soon after it is prepared.

The mixing operation generally requires at least about one half hour per batch, most of which time is used for cooling the paste mix. Since the desired final product is a wet paste, substantial amounts of concentrated sulfuric acid and water are added to the lead-lead oxide powder, and the reaction of these ingredients generates a great deal of heat. The heat which is generated must be rapidly removed in order to prepare good battery active material paste, and this requires expensive cooling equipment.

It is an object of this invention to provide a method of manufacturing stable, pre-sulfated, dry active material for lead-acid battery electrodes in which sulfuric acid and water are added to lead-lead oxide powder so as to produce a dry active material in the form of discrete particles.

In a conventional lead-acid storage battery active material processing, the wet pastes are mixed and cooled to about 120° F. to 130° F., and shortly thereafter are pasted onto storage battery grids. One of the serious disadvantages of allowing the wet paste to remain at elevated temperatures prior to using it is that the properties of the wet paste vary appreciably during the interval between dumping from the mixer and complete use at the pasting machine. This interval of time between mixing and using normally ranges from 1 to 4 hours. The changes in the paste density and composition that occur result in variations in plate weight and performance.

Another object of the invention is to provide a method of manufacturing pre-sulfated, dry active material for lead-acid battery electrodes which is more stable in storage than conventional lead oxides used to make battery pastes and more stable than a conventional wet paste active material.

Other objects and advantages of this invention will be apparent to those skilled in the art in view of the description which follows.

It has been discovered that stable, pre-sulfated, dry active material for either positive or negative lead-acid storage battery electrodes can be manufactured by adding sulfuric acid and a small amount of water to lead-lead oxide powder which is being vigorously agitated, thoroughly mixing these ingredients and drying the mixture so as to produce a pre-sulfated, dry active material in the form of discrete particles. The sulfuric acid and water solution is added to the lead-lead oxide powder only to the extent that the total mixture will remain a powder, either finely dispersed particles or granulated particles. After mixing, a portion of the lead which is present in the lead-lead oxide powder may be permitted to oxidize, which promotes drying and the formation of basic lead sulfates with the sulfuric acid. When it is desired to apply the pre-sulfated, dry active material to a grid, additional water is added to the dry active material to transform it into a wet paste having a plasticity suitable for pasting onto a grid. The method of this invention differs from conventional wet paste preparations with respect to the lesser amount of water added to the lead-lead oxide powder, the vigorous agitation of the lead-lead oxide powder as the sulfuric acid solution is being added thereto, drying the mixture after the addition of the sulfuric acid solution to remove the added water and the water formed by the reaction, and the production of a stable, pre-sulfated, dry active material which is subsequently wetted in order to paste it onto storage battery grids.

The temperature of the active material composition during the mixing process should be maintained between about 250° F. and about 100° F., but this is not particularly critical. In this temperature range, the lead-lead oxide powder forms tribasic lead sulfate ($3PbO \cdot PbSO_4$) and tetrabasic lead sulfate ($4PbO \cdot PbSO_4$), and active material containing these lead sulfates generally gives superior battery performance.

The sulfuric acid and water must be added to the lead-lead oxide powder while it is being vigorously agitated, for otherwise a paste would be formed. The amount of liquid (sulfuric acid and water) which is added to the lead-lead oxide powder is critical. It is essential that the active material be kept relatively dry throughout the mixing operation, i.e. plasticization of the active material must be avoided. Therefore, the amount of water which is added should be kept to a minimum, but some water is necessary to get the desired crystal structure in the final product, i.e. tribasic and tetrabasic lead sulfate. The amount of water present in the lead-lead oxide powder during the mixing operation should not exceed about 8% based on the weight of the dry lead-lead oxide powder, and this includes both water which is added with the sulfuric acid and also water which is formed by the reaction of the lead oxide with the sulfuric acid. If the water exceeds about 8%, the composition is rendered paste-like rather than the desired discrete particles. Though the amount of water which is added is much less than in the preparation of a wet paste active material, the amount of sulfuric acid which is added to the lead-lead oxide powder is about the same as in the preparation of a wet paste active material. There should be sufficient sulfate ions added to the lead-lead oxide powder to produce a pre-sulfated, dry active material which contains from about 5 to about 50% by weight of lead sulfate, with from about 10 to about 30% by weight of lead sulfate being particularly preferred.

In order to produce a pre-sulfated, dry active material which is stable, it is essential that the water present in the final product not exceed about ½ percent based on the weight of the final product. Therefore, after the lead-lead oxide powder, sulfuric acid and water have been mixed so as to form a substantially homogeneous mixture, this mixture must be dried such as by heating or vacuum drying in order to reduce the amount of water present therein. If the water exceeds about ½ percent, there is sufficient moisture present that the resulting product can continue to react causing changes in its density and other properties. The production of a stable product is one of the principal features of this invention It has been found that when water is subsequently added to the stable, pre-sulfated, dry active material of this invention to render it sufficiently plastic to be pasted, there is substantially no increase in the temperature of the paste, and it can be applied to battery grids while at room temperature. This is an additional illustration of the stability of the pre-sulfated, dry active material of this invention. Another advantage of the invention is that the stable, pre-sulfated, dry active material is readily converted into a wet paste suitable for pasting onto grids in from about 5 to about 10 minutes.

Throughout this specification, the invention has been described in terms of adding sulfuric acid and water to the lead-lead oxide powder. Of course, it will be obvious to those skilled in the art that various concentrations of sulfuric acid may be used, and it is generally preferred that the sulfuric acid and water be mixed prior to adding them to the lead-lead oxide powder. In addition, it should be noted that sources of sulfate ions other than sulfuric acid, e.g. ammonium sulfate, may be substituted for the sulfuric acid so long as they do not otherwise adversely affect battery performance. Therefore, as used in this specification and the claims which follow, the term sulfuric acid is intended to include such equivalents.

Pre-sulfated, dry active materials prepared in accordance with this invention are usually non-granulated, finely dispersed uniformly sulfated mixtures. In addition, the dry active material pastes may be in the form of free-flowing granules as disclosed in copending patent application Serial No. 78,876, of which this application is a continuation-in-part. As disclosed therein, granules for filling tube-type electrodes can be prepared by granulating lead oxide powder with water and sulfuric acid so as to provide up to 25% by weight of lead sulfate in the finished blend. If desired, one could mix additional water with these free-flowing granules and convert them into a wet active material paste.

One of the principal advantages of manufacturing the pre-sulfated, dry active material in accordance with this invention is that only a few minutes are required to convert it into a wet paste by adding water. The pre-sulfated, dry active material is particularly stable which enables one to store it, or package and ship it. In fact, it is even more stable than the lead-lead oxide powders which are conventionally used to prepare wet paste active material for lead-acid batteries. The dry active material does not generate heat when water is added to it for pasting onto grids. This method of preparing a stable, pre-sulfated, dry active material can readily be performed as a continuous process, and thereby it overcomes the disadvantages of a batch process. Finally, and perhaps most important, electrodes prepared from pre-sulfated, dry active material have demonstrated that they have improved handling characteristics and give at least equivalent battery performance.

It is within the scope of this invention to incorporate conventional battery electrode additives in the pre-sulfated, dry active material. These may be added during the preparation of the dry active material or after its preparation.

The following specific examples illustrate preferred embodiments of the method of preparing pre-sulfated, dry active material in accordance with this invention.

EXAMPLE I 300 lbs. of pre-sulfated, dry active material were prepared by adding 40 cc./lb. of 1.400 specific gravity sulfuric acid to a lead-lead oxide powder and this mixture was blended in a liquid-solids blender. The sulfuric acid was added while the lead-lead oxide powder was being vigorously agitated, and it took about 14 minutes to add 12 liters of acid solution. After thorough blending, the composition was vacuum dried to below ½% moisture.

The pre-sulfated, dry active material was then converted to a wet paste for negative plates by adding the standard negative additives and water to the dry active material. The wet paste mix was prepared by rumbling the pre-sulfated, dry active material with standard amounts of conventional expanders for negative plates for 5 minutes. Then a small amount of mineral oil and 12 liters of water were added and mixed for 2 minutes. In order to achieve the proper paste plasticity for pasting, it was necessary to add water 3 additional times. The final wet paste density was 148 g./2 cu. in. and it had a plasticity such that a steel ball bearing having a 1 inch diameter penetrated 0.45 inch into the paste when dropped from a height 6 inches above the paste.

The final wet paste was used to machine paste storage battery grids with about 1.42 lbs. per plate of active material, and samples at about 20 plate intervals indicated that the pasted plates were all within weight and thickness specifications for standard negative electrodes. These plates were set, dried and tank formed in accordance with standard procedures. Then 6 cells were assembled using tube-type positive electrodes, rubber separators, sulfuric acid electrolyte and the following negatives:

Cells 1–3____ Standard production negatives.
Cells 4–6____ Negatives prepared from pre-sulfated, dry active material.

These 6 cells were discharged initially at the 6-hour, 4.78-hour and 0° F. rate. They were then placed on stand test. The following results were obtained.

*Initial characteristics*

| Cell No. | 6-hr. rate; Current, 30 amp.; Final voltage, 1.75 v. | 0° F. rate; Current, 2.78 amp.; Final voltage, 1.00 v. | 4.78-hr. rate; Current, 36 amp.; Final voltage, 1.70 v. |
|---|---|---|---|
| 1–3 | 6.40 hrs | 8.43 min | 5.98 hrs. |
| 4–6 | 6.25 hrs | 8.47 min | 5.87 hrs. |

*Open circuit stand test*

| Cell No. | Sp. g. drop in 2 weeks | 6 hr. rate from stand, hrs. | 6 hr. rate after recharge, hrs. | Capacity loss on stand, percent |
|---|---|---|---|---|
| 1–3 | 0.013 | 6.42 | 6.50 | 1.23 |
| 4–6 | 0.012 | 6.39 | 6.45 | 0.93 |

These results indicate that there was no significant performance differences between the cells having the standard production negatives and those having the pre-sulfated negatives. The significance of this example is that the active material paste mix cycling time in accordance with this invention was reduced to about one-half the normal wet paste mixing cycle without adversely affecting the performance of the negative plates.

EXAMPLE II

Pre-sulfated dry active material was prepared in accordance with the procedures set forth in Example I, and this dry active material was converted to a wet paste for positive electrodes by merely adding water to the pre-sulfated, dry active material. The final wet paste had a density of 142 g./2 cu. in. and a plasticity such that the 1 inch diameter steel ball bearing penetrated 0.50 inch into the paste. In addition, some pre-sulfated, dry active material was prepared using an ammonium sulfate $$(NH_4)_2SO_4$$

solution instead of sulfuric acid to pre-sulfate the lead-lead oxide powder and convert it into a pre-sulfated, dry active material. This dry active material was also converted into a wet paste for positive plates and had a density of 133 g./2 cu. in. and a plasticity of 0.50 inch.

The final wet paste was used to hand paste storage battery grids which were then paper set and tank formed in

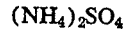

1.050 specific gravity sulfuric acid. Test cells were assembled using standard negative electrodes, ribbed microporous rubber separators, 1.275 sp. g. sulfuric acid electrolyte and the following positives:

Cells 1–3 -------- Laboratory stock positives.
Cells 4–6 -------- Positives prepared from $(NH_4)_2SO_4$ pre-sulfated dry active material.
Cells 7–9 -------- Positives prepared from $H_2SO_4$ pre-sulfated dry active material.
Cells 10–12 ------ Factory stock positives.

The positive plates were tested for plate cycle life, plate handling and positive active material shedding. All cells were discharged initially at 0.8 amp. to 1.75 volts. All cells were cycled by charging at 0.5 amp. for 4 hours and discharging at 0.75 amp. for 2 hours. Plate handling strength was determined by calculating the active material loss after vibrating the plate for a measured time period at a constant frequency on a vibrating table. Positive shedding rate was determined by weighing the plates before their initial discharge and after completion of 100 cycles. The following results were obtained:

| Cell No. | Cycle 1: 0.8 amp., 1.75 v. | Cycle 100: 0.8 amp., 1.75 v. | Percent capacity loss for 100 cycles | Pos. Shedding, percent act. mat. loss—100 cycles | Handling Test, percent act. mat. loss |
|---|---|---|---|---|---|
| 1–3 | 3.56 AH | 1.91 AH | 46.4 | 49 | 6.01 |
| 4–6 | 3.57 AH | 2.07 AH | 42 | 51.7 | 8.89 |
| 7–9 | 3.70 AH | 3.00 AH | 19 | 20.8 | 1.30 |
| 10–12 | 3.20 AH | 2.00 AH | 40 | 49.4 | 6.15 |

The plates prepared from the pre-sulfated, dry active material which was prepared using an ammonium sulfate solution had substantially equivalent initial capacity, cycle life and positive shedding data when compared to stock control plates. The positive plates prepared from the active material which was pre-sulfated with sulfuric acid had better handling characteristics, less shedding and less capacity loss on cycle than stock control plates.

Having completely described this invention, what is claimed is:

1. A method of manufacturing a stable, pre-sulfated, dry active material for a lead-acid storage battery electrode which comprises adding sulfuric acid and water to lead-lead oxide powder which is being vigorously agitated, thoroughly mixing the composition, said water being added in amounts such that the water present in the composition does not exceed about 8% by weight of the lead-lead oxide powder, said sulfuric acid being added in amounts sufficient to produce a dry active material product which contains from about 5 to about 50% by weight of lead sulfate, drying said composition so that it contains less than ½% by weight of water, and recovering in the form of discrete particles a stable, pre-sulfated, dry active material for a lead-acid storage battery electrode.

2. A method in accordance with claim 1 in which the stable, pre-sulfated, dry active material contains from about 10 to about 30% by weight of lead sulfate.

3. A method in accordance with claim 1 in which the temperature of the composition during the mixing of the composition is maintained between about 250° F. and about 100° F.

4. A method in accordance with claim 1 in which the suufuric acid and water are sprayed into the vigorously agitated lead-lead oxide powder.

5. A method in accordance with claim 1 in which the sulfuric acid and water which are added to the lead-lead oxide powder are in the form of a sulfuric acid solution having a specific gravity of about 1.4.

6. A method in accordance with claim 5 in which the amount of sulfuric acid and water which is added to the lead-lead oxide powder is about 40 cc./lb.

References Cited by the Examiner
UNITED STATES PATENTS
3,124,486   3/64   Malloy _____ 136—26 X JOHN H. MACK, *Primary Examiner.*